Aug. 7, 1934.　　　　H. C. RIPPEL　　　　1,969,579

FLASH REMOVER

Filed Jan. 29, 1932

Inventor

HERBERT C. RIPPEL

By Richey & Watts

Attorneys

Patented Aug. 7, 1934

1,969,579

UNITED STATES PATENT OFFICE 1,969,579

FLASH REMOVER

Herbert C. Rippel, Youngstown, Ohio, assignor to Republic Steel Corporation, Youngstown, Ohio, a corporation of New Jersey Application January 29, 1932, Serial No. 589,673

5 Claims. (Cl. 164—60)

This invention relates to an apparatus for removing the burr or flash from a welded tube.

In the present practice one method of removing the burr or flash produced by welding the abutting edges of a tubular blank is through the medium of a rigidly fixed knife edge which engages the welded seam and removes any extruded metal. In another method a rotary tool or grinder has its working edge so disposed with relation to the seam as to cut or grind off the excess metal or burr.

It is within the purview of the present invention to provide an apparatus for removing flash from an article wherein the tool is adapted to be maintained in a fixed position during the cutting operation, relative to the longitudinal axis of the article being acted upon. The movement of the cutting tool is adapted to be effected and controlled by the moving article which may be a welded tubular blank or the like.

The illustrated embodiment of the subject invention contemplates the provision of a stand of rolls adapted to receive the welded pipe as it is discharged from the welding throat. This roll stand comprises a pair of vertically disposed rolls adapted to engage the opposite exterior walls of the pipe at spaced points. Upon the top surface of each roll a disc is disposed having a knife edge which contacts with the flash of the welded seam and removes the same through a wiping action.

It is among the objects of this invention to provide an apparatus for removing the flash from the welded seam of a tubular member which will always remove a predetermined amount of metal, which will have a longer life, and will more effectively remove the flash resulting in a smoother exterior surface to the welded seam and a stronger seam weld.

Other objects and numerous advantageous features will be apparent in the following detailed description considered in conjunction with the accompanying drawing wherein similar characters of reference designate similar parts and wherein.

Figure 1:
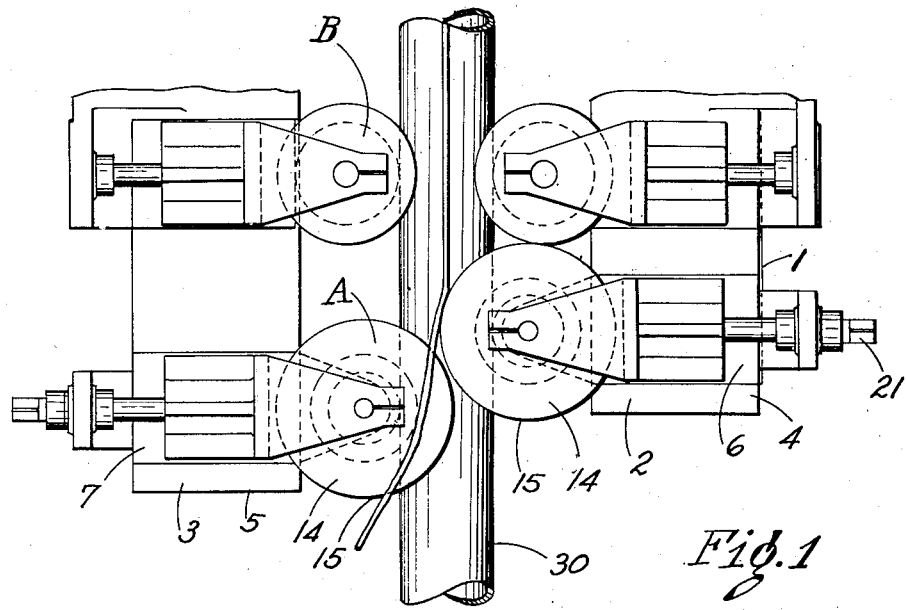
Figure 1 is a top plan view of a portion of a welding unit illustrating a set of pressure rolls and the disposition of my flash remover relative thereto.

With reference to the drawing the illustrated embodiment of my invention comprises a flash remover A which is shown disposed in operative relation with the welding throat of a welding machine, the latter including electrodes C and pressure rolls B. The flash remover A comprises a base 1 which is an extension of the supporting base of the pressure rolls B having opposed upwardly extending supporting portions 2 and 3. The portion 3 is preferably of greater length than the portion 2 to accommodate the spaced relation of the cutting discs for removing the flash or extruded metal to be hereinafter described. The top surface 4 of each supporting portion 2 and 3 has formed thereon a guide 6 and 7 respectively. The guides 6 and 7 are adapted to slidably receive the dovetail form on the bottom portion of a bracket 8.

The bracket 8 is formed with a bifurcated portion 9 which is adapted to carry a vertically disposed shaft 10 having disposed suitable bearing members 11 on which is mounted a tube engaging roll 12. The rolls 12 are disposed on the shafts 10 so as to allow for a limited amount of free movement or floating of these rolls on the shafts, in order that there will be a minimum amount of slipping between the exterior walls of the pipe and rolls 12, the rolls being adapted to move vertically with the pipe. On the upper surface of the roll 12 and bolted thereto as at 13 is a disc 14 having a knife edge 15.

Figure 2:
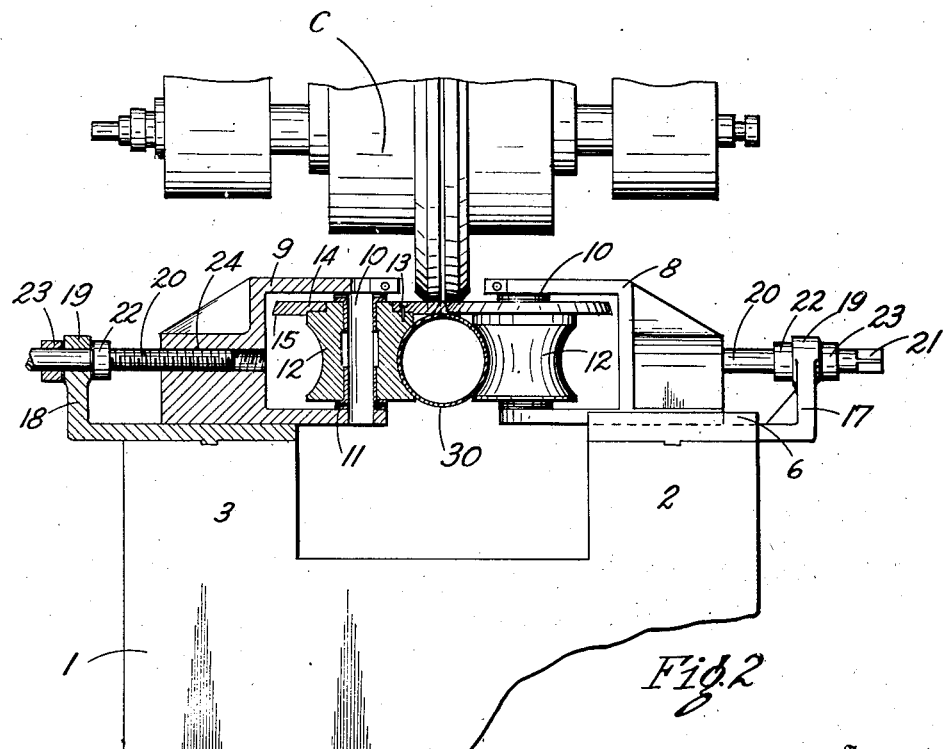
Figure 2 is a fragmentary front elevational view partly in section of my flash remover.

Referring to Figures 1 and 2 there is shown a pipe 30 disposed between the opposed rolls 12. The knife edge 15 of the disc 14 is adapted to extend outwardly from the bracket 8 and engages the base of the extruded metal of the welded seam.

Secured to the supports 2 and 3 are offset arms 17 and 18 terminating in bosses 19, which are adapted to rotatably receive adjusting shafts 20. The shafts 20 are provided with squared ends as at 21 to receive a handle or wrench for rotation of the same. Collars 22 and 23 are disposed on opposite sides of the bosses 19 and securely fixed to the shaft to prevent end play of the same.

The inner end 24 of the shaft is in threaded engagement with the brackets 8 and 9, thereby imparting adequate adjustment to the tube engaging rolls and the cutting discs. Thus it is possible to adjust the cutting discs to accommodate any variable amount of flash upon the welded tube. This adjusting means further provides a means of varying the pressure between the rolls 12 and the exterior wall of the pipe wherein the peripheral speed of the knife edge is varied which will be referred to hereinafter.

The provision of two cutting discs and the spaced position thereof is that during the forming operations of the tube and subsequent welding thereof, the abutting ends are not consistently in perfect alignment. In other words a step is formed in some instances at the seam of the tube, the rolls 12 contacting with the cylindrical portion of the tube on opposed sides thereof definitely locate each cutting disc tangentially with the tube at the point of weld, whereby it is assured that the entire burr or flash will be removed by either of the cutting discs regardless of any slight out of round condition of the tube. If the tube should weave or move vertically, the cutting edge of the disc is always in proper cutting relation to remove the butt as the rolls 12 are so disposed as to float or move on the shafts 10 with the pipe 30.

The flash removing apparatus is so designed that the cutting edge of the disc moves at a greater speed than that of the pipe with which it contacts. The peripheral speed of the disc is controlled through the point of drive between the contacting surface of the roll and the wall of the pipe. This point varies with the pressure exerted on the wall of the pipe through the rolls 12, but at no point will the peripheral speed of this point be as great as the peripheral speed of the knife edge due to the common axis and the different diameters. This provision gives a wiping action to the knife edge as it contacts with the extruded metal of the welded seam resulting in a cleaner, more even and consistent cut.

Although the foregoing description is necessarily of a detailed character in order to completely set forth this invention it is to be understood that the specific terminology is not intended to be restrictive or confining and it is further understood that various rearrangements of parts and modifications of structural detail may be resorted to without departing from the scope or spirit of the invention as herein claimed.

I claim:

1. Flash removing apparatus including a pair of rolls disposed in opposed staggered relation to engage opposite sides of a welded pipe having a longitudinal flash, and cutting members secured to adjacent end surfaces of the rolls and engageable with the longitudinal flash to cut the same.

2. Flash removing apparatus including a pair of rolls mounted for axial movement on vertical axes and disposed in opposed staggered relation to receive therebetween a welded pipe having a longitudinal flash and cutting members secured to adjacent end surfaces of the rolls and engageable with the longitudinal flash to cut the same.

3. Flash removing apparatus including a rotary cutter positioned to cut the longitudinal flash of an axially moving length of welded pipe, a roller connected to the cutter and frictionally engageable with the pipe for rotating the cutter to cut the flash and means for pressing the pipe against the roller with sufficient pressure to rotate the roller.

4. Flash removing apparatus including a rotary cutter positioned to cut the longitudinal flash of an axially moving length of welded pipe, a roller connected to the cutter and frictionally engageable with the pipe for rotating the cutter to cut the flash, the radius of the cutting edge of the cutter exceeding the outside radius of the pipe so as to pass entirely across the flash area, and means for pressing the pipe against the roller with sufficient pressure to rotate the roller.

5. Flash removing apparatus including a pair of rolls mounted for axial movement on vertical axes and disposed in opposed staggered relation to receive therebetween a welded pipe having a longitudinal flash and cutting members secured to adjacent end surfaces of the rolls and engageable with the longitudinal flash to cut the same, the radius of the cutting edge of each cutter exceeding the outside radius of the pipe so as to pass entirely across the flash area.

HERBERT C. RIPPEL.